(12) United States Patent
Kasanjian-King

(10) Patent No.: US 12,466,305 B1
(45) Date of Patent: Nov. 11, 2025

(54) RATCHET SYSTEM

(71) Applicant: Zackary Kasanjian-King, Corona, CA (US)

(72) Inventor: Zackary Kasanjian-King, Corona, CA (US)

( * ) Notice: Subject to any disclaimer, the term of this patent is extended or adjusted under 35 U.S.C. 154(b) by 3 days.

(21) Appl. No.: 19/004,975

(22) Filed: Dec. 30, 2024

Related U.S. Application Data

(60) Provisional application No. 63/718,219, filed on Nov. 8, 2024.

(51) Int. Cl.
*B60P 7/08* (2006.01)

(52) U.S. Cl.
CPC .................................. *B60P 7/083* (2013.01)

(58) Field of Classification Search
CPC .............................. B60P 7/0823; B60P 7/083
USPC .......................................... 410/12, 100, 103
See application file for complete search history.

(56) References Cited

U.S. PATENT DOCUMENTS

| | | | | |
|---|---|---|---|---|
| 6,698,983 B1 * | 3/2004 | Kiernan | ............... | A61G 3/0808 |
| | | | | 410/12 |
| 2006/0188354 A1 * | 8/2006 | Bosley | ................... | B60P 7/083 |
| | | | | 410/103 |
| 2010/0215455 A1 * | 8/2010 | Burris | .................. | B60P 7/0807 |
| | | | | 410/100 |

OTHER PUBLICATIONS

Handy Industries; Hawk Hold Tie Down System; https://handyindustries.com/hawk-hold/.

NeaLia; Retractable Truck Bed Ratchet Straps for Ford F150, 10 ft Truck Straps for F250 F350 Raptor 2015-2025, Self Retracting Tie Down with Boxlink Plates Mounted Brackets Bed Mount Heavy Duty Bolt on; https://www.amazon.com/dp/B0DSJ3MVLD/ref=sspa_dk_detail_2?psc=1&pd_rd_i=B0DSJ3MVLD&pd_rd_w=5Hp8N&content-id=amzn1.sym. f2f1cf8f-cab4-44dc-82ba-0ca811fb90cc&pf_rd_p=f2f1cf8f-cab4-44dc-82ba-0ca811fb90cc&pf_rd_r=Y79B8WC54VHRB1XJK807&pd_rd_wg=8p1if&pd_rd_r=8e8bee63-3851-497.

Rad Truck Straps; https://radtruckstraps.com/products/two-rad-truck-straps-with-hardware.

* cited by examiner

*Primary Examiner* — Stephen T Gordon
(74) *Attorney, Agent, or Firm* — Braxton Perrone, PLLC; Bobby W. Braxton; Gregory Perrone

(57) ABSTRACT

A system for a ratchet. The system includes a base mount. The base mount is coupled to a ratchet mount via a first pivot point. The ratchet mount also has a second pivot point. The base mount is pivotable relative to the ratchet mount via the first pivot point. This allows the ratchet to pivot or rotate about at least two pivot points.

12 Claims, 23 Drawing Sheets

RATCHET SYSTEM

BACKGROUND OF THE INVENTION

Priority

The present invention claims priority to Provisional No. 63/718,219 filed Nov. 8, 2024, the entirety of which is hereby incorporated by reference.

Technical Field

The present invention relates to a system and method for a ratchet system.

DESCRIPTION OF RELATED ART

Ratchet systems are used to secure and hold items during towing, moving, etc. However, securing items with ratchet systems can be difficult. Consequently, there is a need for an improved system and method.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
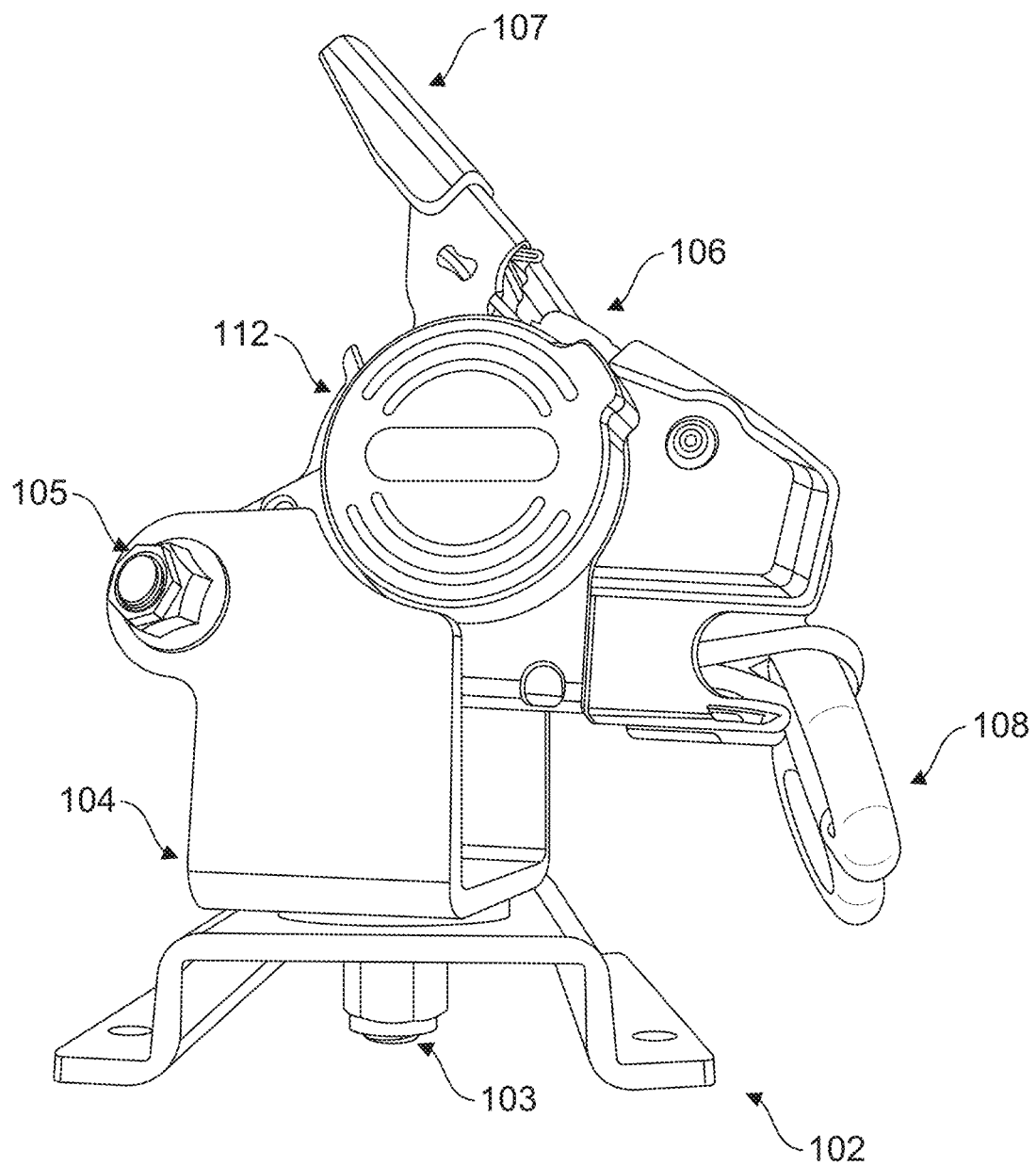
FIG. 1 is a front perspective view of the ratchet system in one embodiment.

FIG. 1 is a front perspective view of the ratchet system in one embodiment. A ratchet typically tightens a strap between one or more points. There are various types of ratchets. Virtually any ratchet can be utilized in the system and method discussed herein. Some ratchet systems have one or more ratchet couplers which are used to apply tension to an object. Some ratchet systems have a strap which has hook on one end, and a free strap on the other end. The hook couples to an object, such as a receiver in a trailer. The free end is received by a ratchet which can tighten and/or loosen the strap.

The ratchet, in some embodiments, also has a coupler, such as hook. The hook, as an example, can couple to an object or another receiver on a trailer. When the ratchet is manipulated, the tension on the strap is increased-typically by shortening the strap. While in one embodiment the ratchet will comprise a coupler, such as a hook, which can be placed in various locations, in other embodiments, the ratchet is fixed. In such embodiments, the ratchet system comprises a single coupler, such as a hook.

The coupler is any object which allows a strap to couple or secure to an item. This can comprise a hook, a hitch, etc.

FIG. 1 illustrates one embodiment wherein the ratchet can pivot about two separate pivot points. As will be described below, this capability provides significant advantages. This allows the ratchet strap to be secured at virtually any angle. This is a huge advantage over the prior art which does not provide for pivoting about two separate pivot points. Securing at various angles allows for a more secure strap, and therefore a more secure load. The multiple pivots also increase the points at which a ratchet can be mounted.

As shown the ratchet 106 comprises a ratchet handle 107. This allows the user to selectively grab and pull the strap so as to increase tension on the strap. In some embodiments the strap is wound around the center spool 112. The center spool 112 stores excess strap and allows the strap to unwind or wind. The user moves the ratchet handle 107 up and down to gather strap and increase tension on the deployed strap. The ratchet maintains the tension on the strap.

At one end of the strap is the ratchet coupler 108, as previously described. The user grasps the ratchet coupler 108 and obtains enough slack in the strap to secure the ratchet coupler 108 to an item. As noted, the item can be a receiver, a hitch, another coupler, part of the item to be secured, a securing device located on a trailer or truck for example, etc. Thereafter, the tension of the strap is increased to secure the item in the desired location.

As noted, the ratchet 106 can comprise virtually any type of ratchet 106 known in the art. The ratchet 106, as discussed below, is coupled to two separate mounts which allow for two separate pivot points. In one embodiment, the two separate pivot points are perpendicular to one another. As will be discussed in more detail below, in some embodiments more than two pivot points are utilized.

As shown the ratchet it coupled to a ratchet mount 104. In one embodiment, and as depicted, the ratchet 106 is coupled to the ratchet mount 104 via the second pivot point 105. The second pivot point 105 can comprise a screw, bolt, hinge, or the like, which allows the ratchet 106 to pivot/rotate about the second pivot point 105 relative to the ratchet mount 104.

As shown the second pivot point 105 comprises a bolt and nuts which secure the ratchet 106 to the ratchet mount 104. In one embodiment, both the ratchet 106 and the ratchet mount 104 comprise voids or holes for receiving the second pivot point 105. Thus, for example, the holes in both the ratchet 106 and the ratchet mount 104 are aligned, and a bolt, or the like, is inserted. The bolt couples the ratchet 106 to the ratchet mount 104 and allows the two pieces to pivot relative to one another.

The ratchet mount 104 can comprise virtually any material, including metal, plastic, rubber, nylon, and combinations thereof. As shown, the ratchet mount 104 is sized such that it comprises an internal cavity to allow the ratchet 106 to pivot. As will be shown in subsequent figures, in one embodiment the ratchet mount 104 comprises a U-shape. Specifically, it has two parallel vertical sides which are connected by a horizontal bottom side, which is perpendicular to the parallel vertical sides. In some embodiments the bottom side comprises a void through which the bolt can be inserted. In some embodiments, the bottom side of the ratchet mount 104 is parallel, and adjacent to, the lower base mount 102.

Coupled to the ratchet mount 104 is the base mount 102. The base mount 102 couples and secures to any base. The base can comprise a post, a planar surface, a trailer, etc. In one embodiment, as discussed herein, the base mount 102 couples to the bed of a truck. This is for illustrative purposes only and should not be deemed limiting.

Coupling the base mount 102 to the ratchet mount 104 is a first pivot point 103. The first pivot point 103 can comprise the same or different type of hinges as the second pivot point 105. As shown, the first pivot point 103 comprises nuts and bolts. The first pivot point 103 allows the ratchet mount 104 to rotate relative to the base mount 102. The first pivot point 103 and the second pivot point 105 work together to provide two separate pivot points. This allows the ratchet 106 to move to virtually any angle. This allows the strap of the ratchet 106 to take a direct line and optimally secure an item.

The base mount 102 can comprise the same or different materials as the ratchet mount 104.

Figure 2:
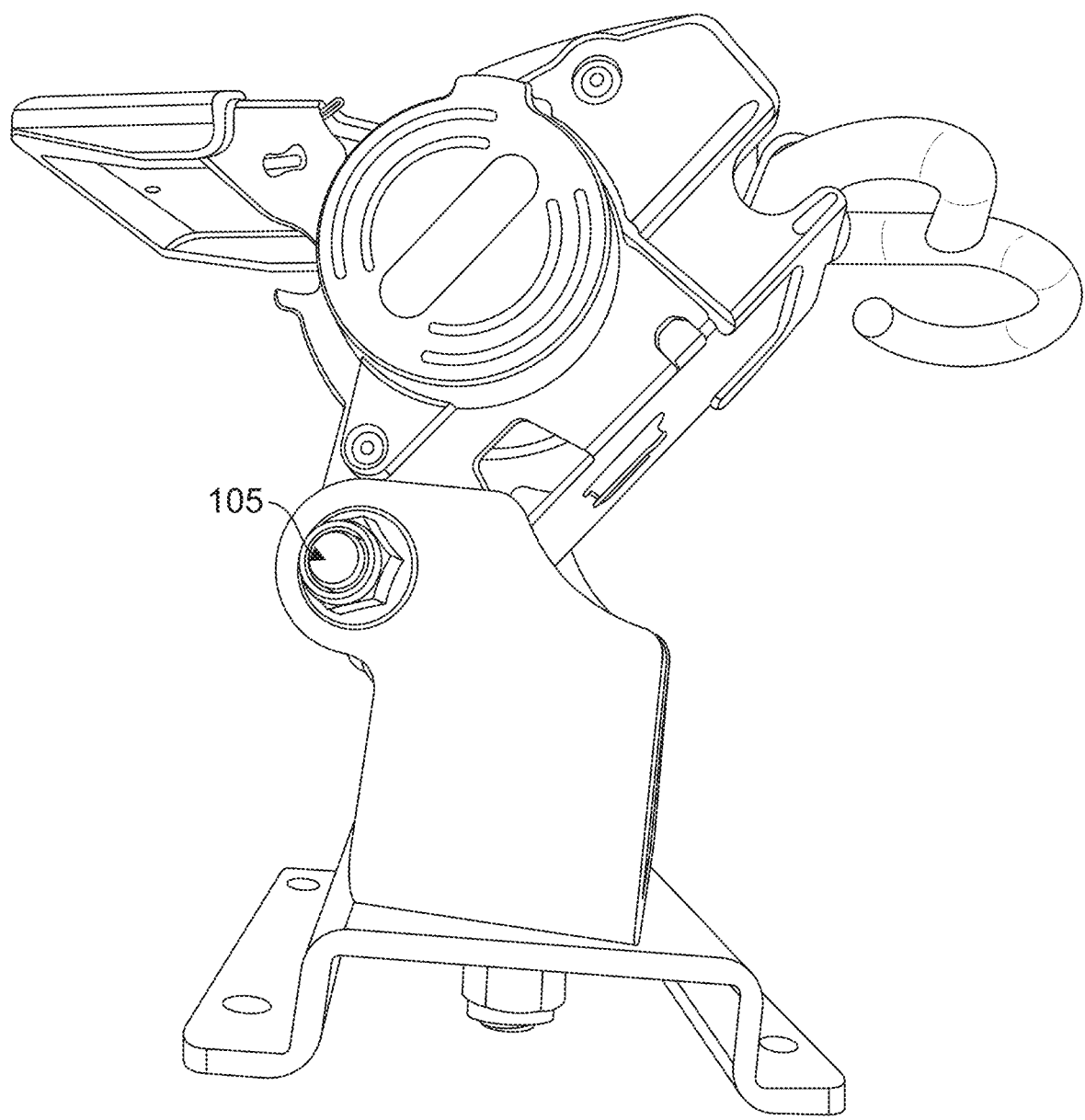
FIG. 2 is a front perspective view with the ratchet rotated about the second pivot point in one embodiment.

Turning to FIG. 2, FIG. 2 is a front perspective view with the ratchet 106 rotated about the second pivot point 105 in one embodiment. As can be seen, the ratchet 106 is tilted upward (as depicted), as the ratchet 106 pivots about the second pivot point 105. In the embodiment depicted, the ease with which the ratchet 106 can be pivoted about the second pivot point 105 is adjustable. As shown, the nut can be tightened against the bolt to make it harder to rotate.

Figure 3:
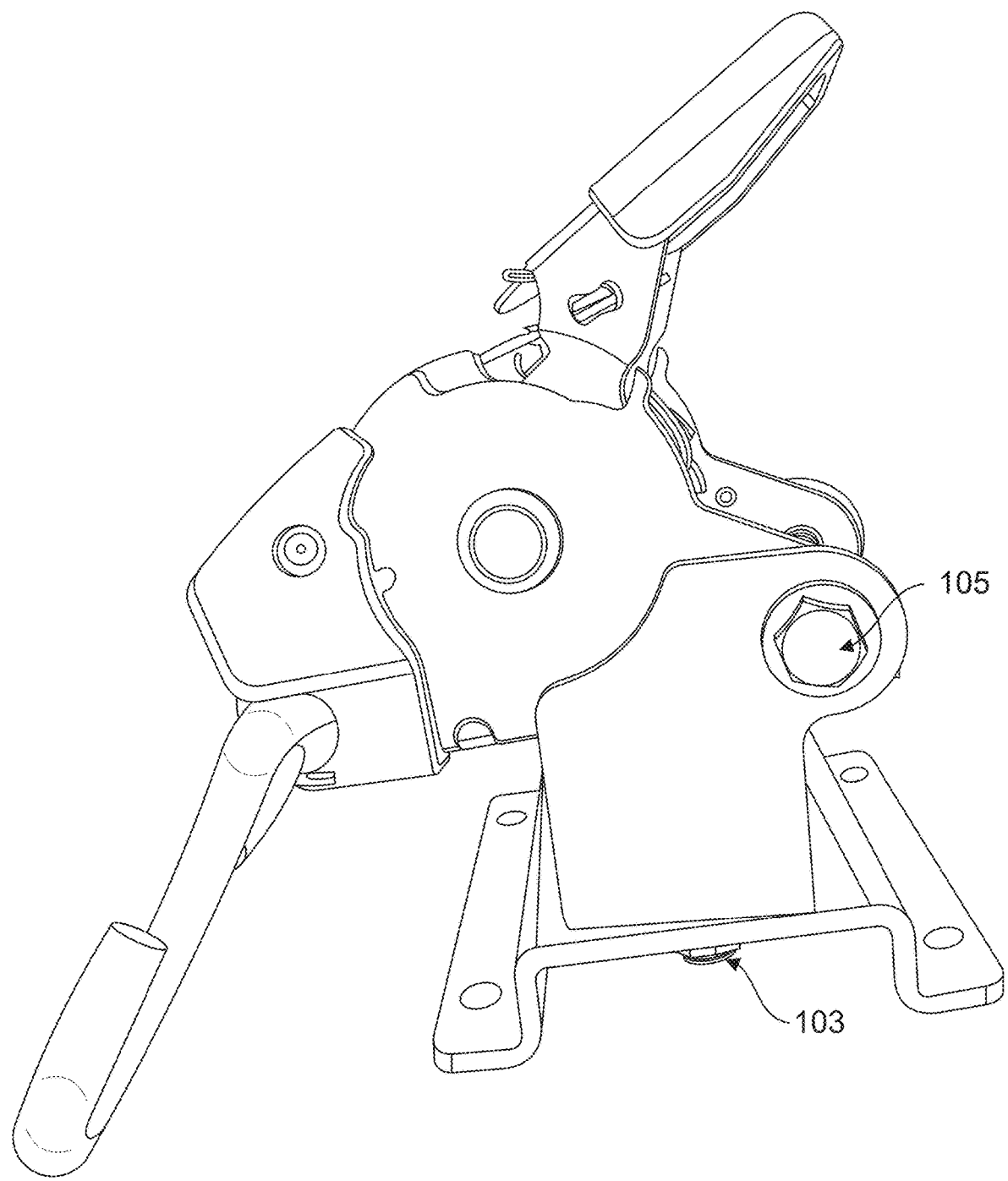
FIG. 3 is a front perspective view of the ratchet system rotated about the first pivot point in one embodiment.

Turning to FIG. 3, FIG. 3 is a front perspective view of the ratchet 106 about the first pivot point 103 in one embodiment. As can be seen the ratchet handle 107 is pointing right in FIG. 3, whereas it was pointing left in FIG. 2. This is because the ratchet mount 104 has been rotated 180 degrees about the first pivot point 103 relative to the base mount 102. Thus, the ratchet can be pivoted about the first pivot point 103, the second pivot point 105, or combinations of the two.

Figure 4:
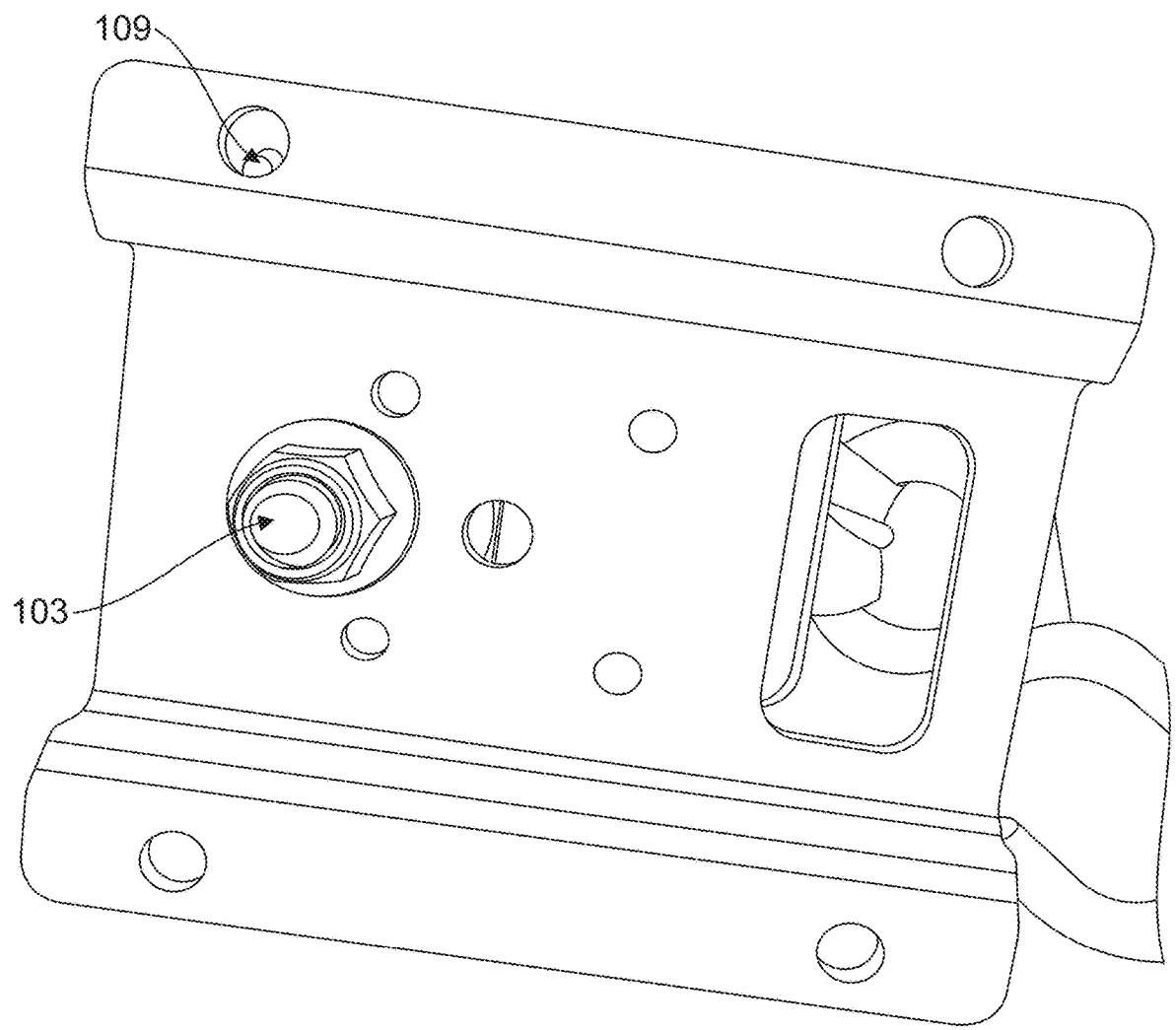
FIG. 4 is a bottom view of the base mount in one embodiment.

Turning to FIG. 4, FIG. 4 is a bottom view of the base mount 102 in one embodiment. As can be seen, the base mount 102 has a plurality of holes or voids 109 through which a securement device, such as a screw, nail, bolt, etc. can be inserted to secure the base mount 102 to a base. The first pivot point 103 is visible in FIG. 4. As shown, the first pivot point 103 is approximately perpendicular to the length of the base mount 102. The first pivot point 103, in one embodiment, is approximately perpendicular to the second pivot point 105.

Figure 5:
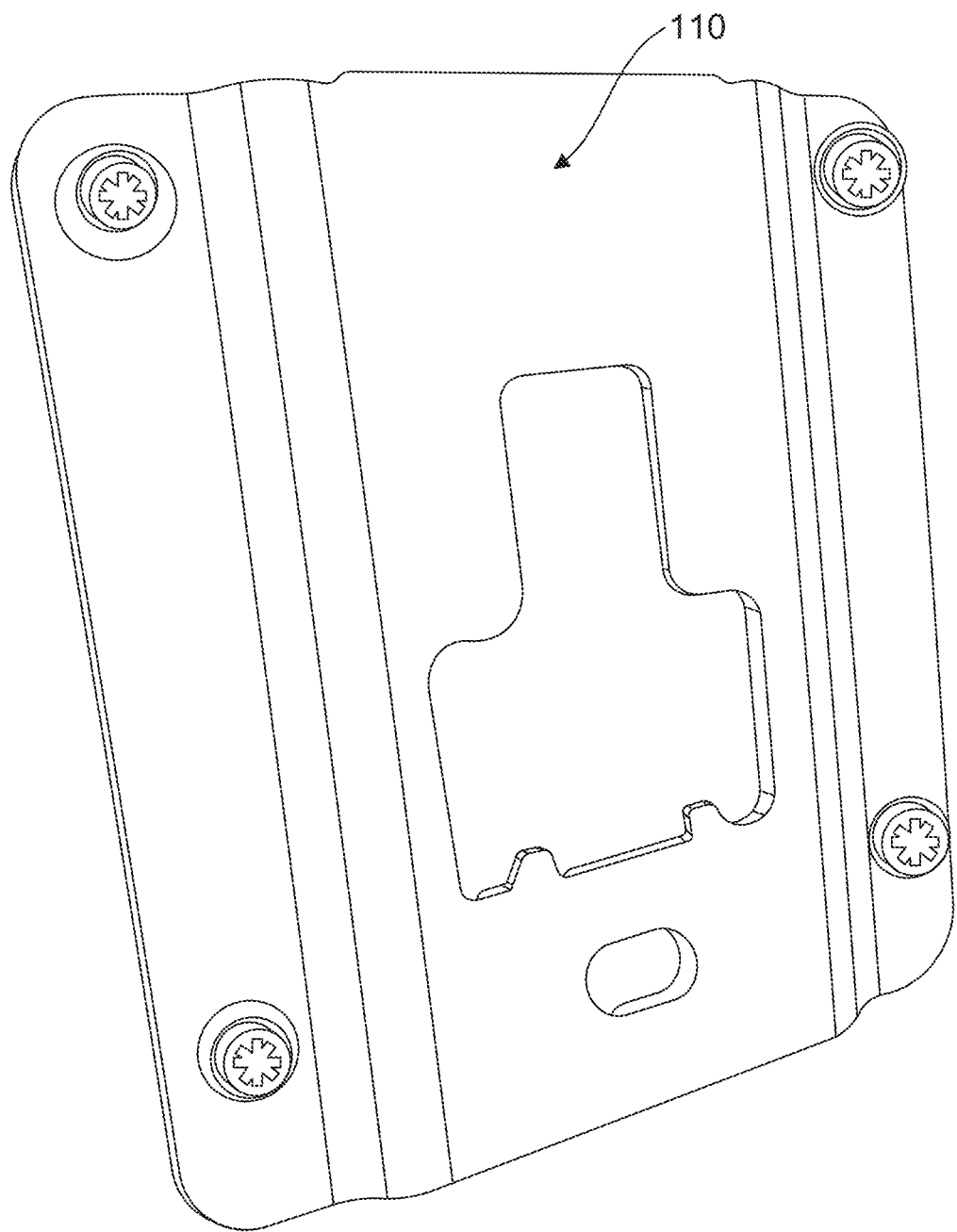
FIG. 5 is a perspective view of the base plate in one embodiment.

Turning to FIG. 5, FIG. 5 is a perspective view of the base plate 110 in one embodiment. In some vehicles, a base plate 110 provides a base location for which to couple a coupler. In the embodiment depicted, as an example, a coupler such as a hook can secure at various locations in the base plate 110. In some embodiments, and as shown in subsequent figures, if the base plate 110 is removed, then the base mount 102 can be installed. As shown, the base plate 110 has four screws in the four corners, which coincide with the location of voids of the base mount 102. The same screws removed from the base plate 110 can be used to couple the base mount 102 to a base or structure, in this case, the bed of a truck.

Figure 6:
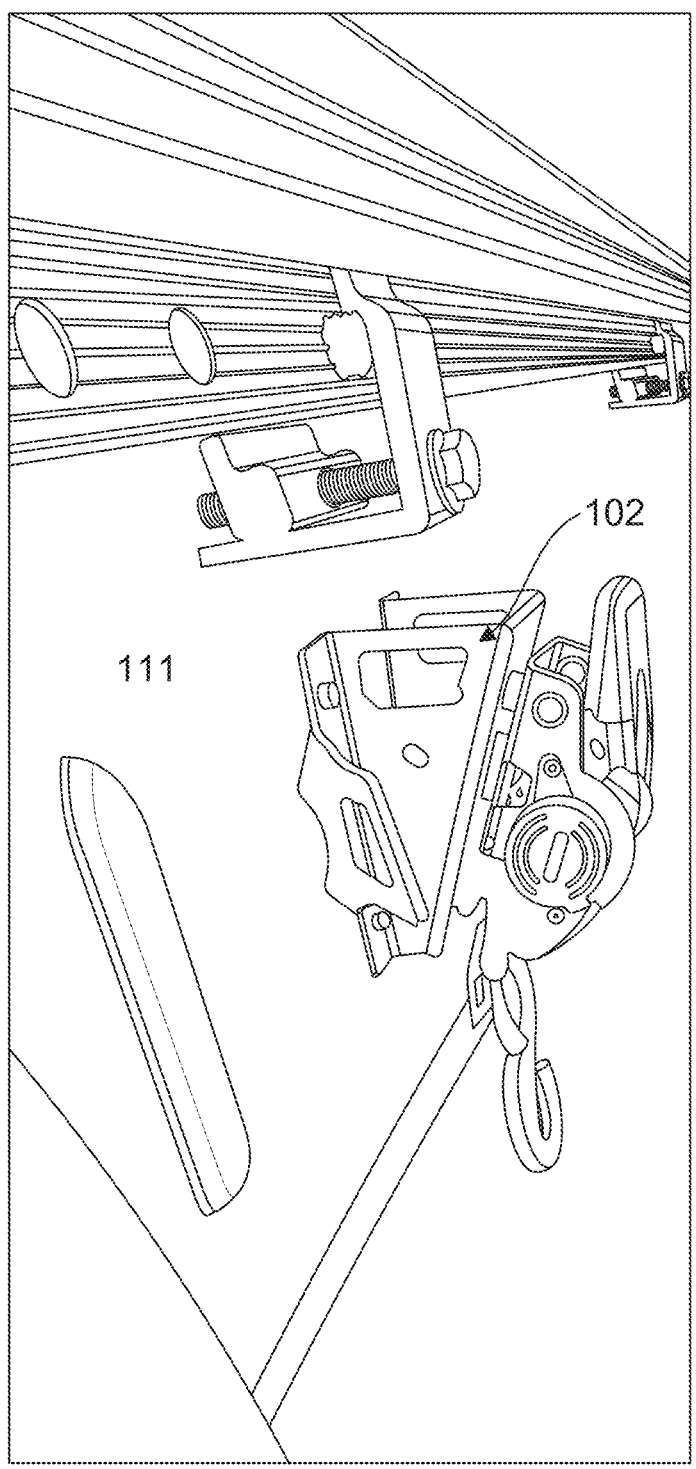
FIG. 6 is a perspective view of the ratchet system installed in a truck bed in one embodiment.

Turning to FIG. 6, FIG. 6 is a perspective view of the ratchet system installed in a truck bed in one embodiment. In this embodiment the ratchet mount 104 couples to the base mount 102 an angle. As shown, the ratchet system is mounted so that it is virtually in line with the top of the bed. Put differently, the ratchet system does not undesirably take up bed space by projecting outwardly in the bed of the truck.

Figure 7:
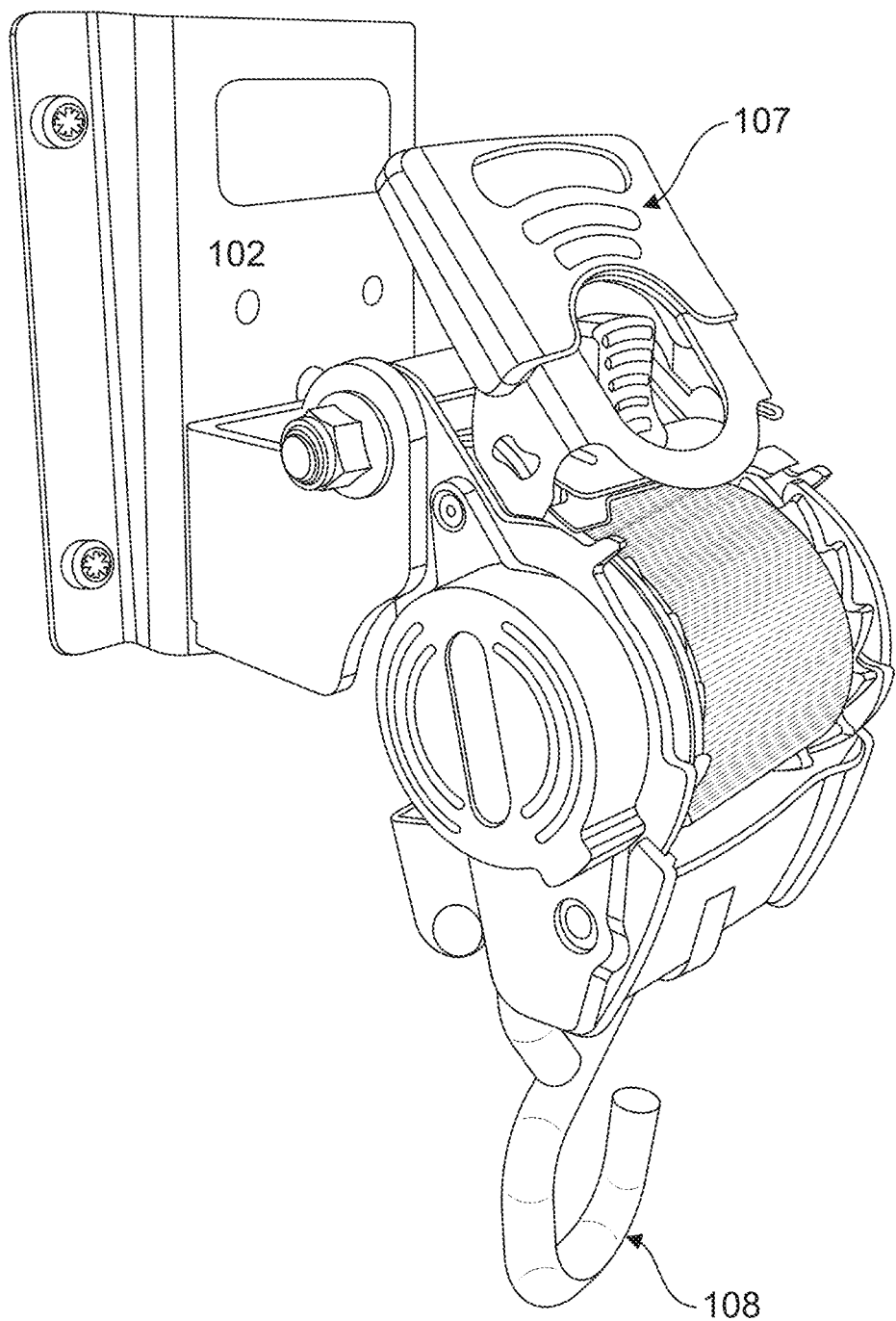
FIG. 7 is a perspective view of the ratchet system with the ratchet handle pointing upward in one embodiment.

Turning to FIG. 7, FIG. 7 is a perspective view of the ratchet system with the ratchet handle 107 pointing upward in one embodiment. The base mount 102 is shown installed on the sidewall of a truck bed, as previously described. As shown, it is installed via four screws removed from the base plate 110 shown in FIG. 5. The second pivot point 105 is visible in this figure. As can be seen, a user can grasp the coupler 108 and pull sufficient strap length out to secure an item. If the angle needs adjusting, the user can pivot the ratchet as desired about either the first pivot point 103, the second pivot point 105, or both.

Figure 8:
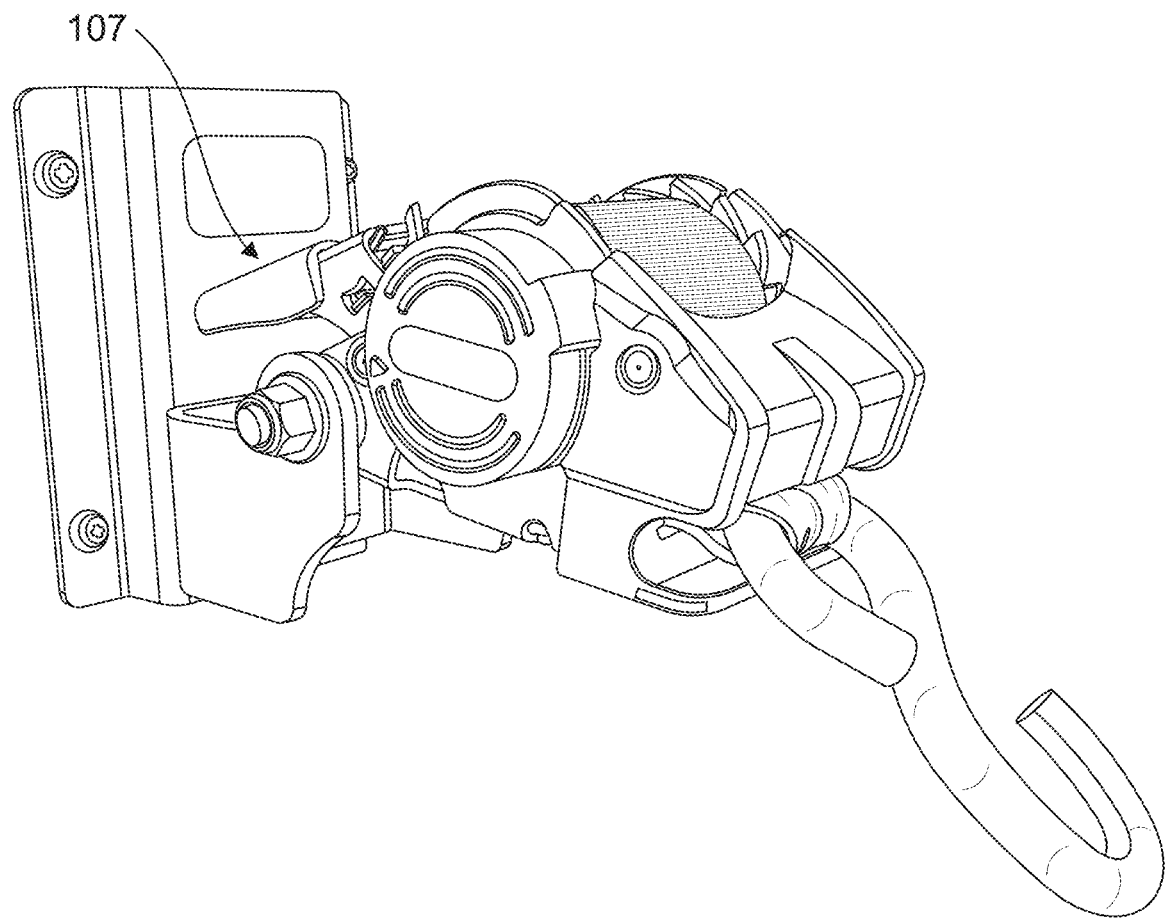
FIG. 8 is a perspective view of the ratchet system with the ratchet handle rotated about the second pivot point in one embodiment.

FIG. 8 is a perspective view of the ratchet system with the ratchet handle 107 rotated about the second pivot point 105 in one embodiment. As can be seen, ratchet handle 107 now points toward the base mount 102. The ratchet coupler 108 now points away from the base mount 102.

Figure 9:
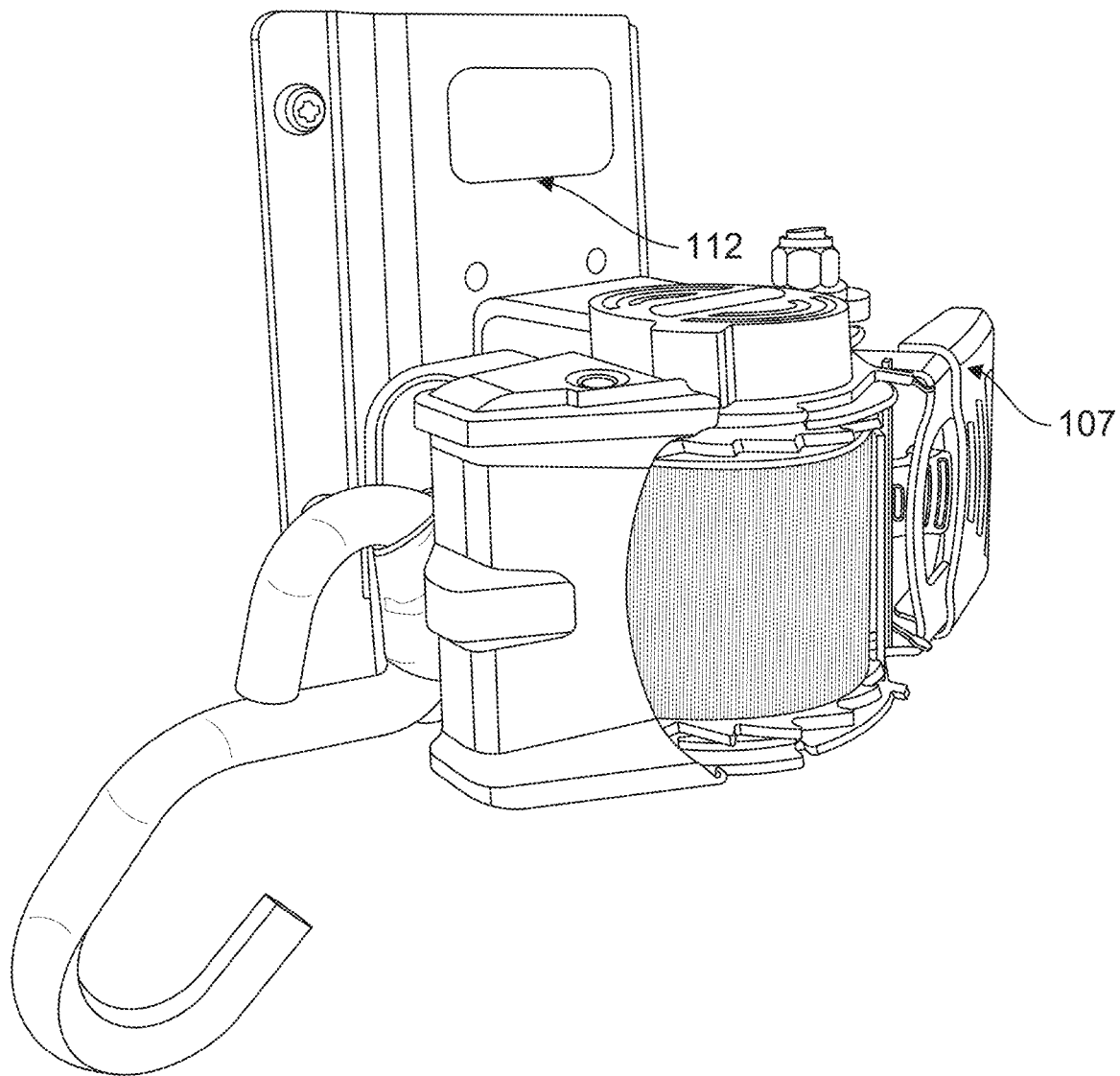
FIG. 9 is a perspective view of the ratchet system with the ratchet handle rotated about the first pivot point in one embodiment.

FIG. 9 is a perspective view of the ratchet system with the ratchet handle rotated about the first pivot point 103 in one embodiment. As shown, the ratchet handle 107 is now parallel with the length of the truck bed. The ratchet mount 104 is perpendicular to the base mount 102.

As shown, the base mount 102 comprises a receiver 112. This receiver 112 can receive the coupler 108 from another ratchet system, for example. The receiver 112 provides an anchor point to which a coupler can attach. If two ratchet systems are installed on opposing sides of the bed, then then each coupler can be received in the other receiver 112 to quickly secure an item.

Figure 10:
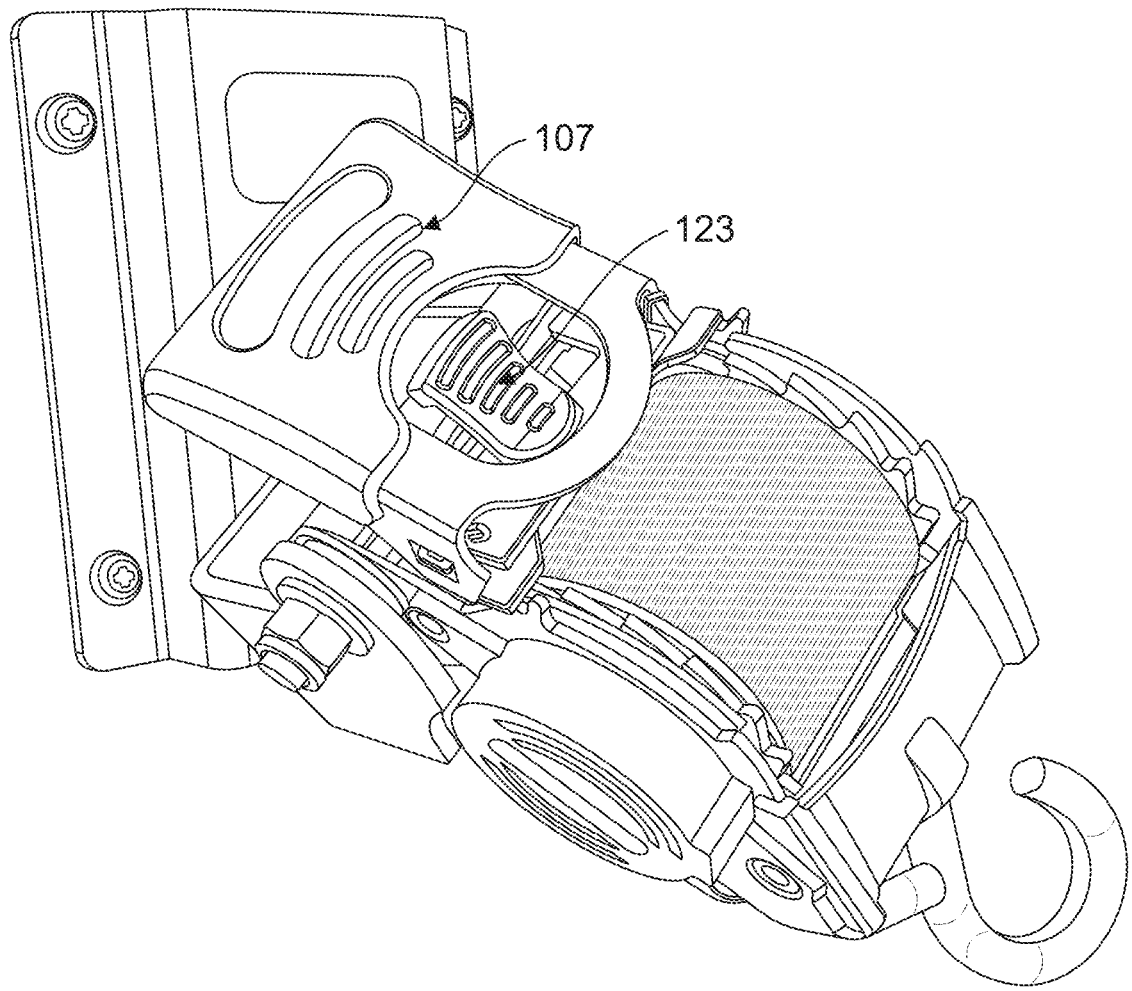
FIG. 10 is a perspective view of the ratchet system with the ratchet handle at an angle in one embodiment.

Turning to FIG. 10, FIG. 10 is a perspective view of the ratchet system with the ratchet handle at an angle in one embodiment. Thus, the ratchet need not be at a right angle relative to the base mount 102.

As shown the ratchet comprises the ratchet handle 107 and a release lever 123. The user can use the release lever 123 to disengage the ratchet system. While a handle 107 and release lever 123 are shown for this particular ratchet, these are for illustrative purposes only and should not be deemed limiting. There are various types of controls for various ratchet systems which can be utilized in the ratchet system described herein.

As shown, the ratchet system can pivot about at least two pivot points. This makes deploying and securing the straps easier and quicker compared to prior art straps. By pivoting the ratchet as necessary, the user can deploy the strap at the ideal angle. Further, because the ratchet can pivot, the ratchets can be left in place and deployed as necessary. If the ratchets could not pivot, they would often need to be moved depending on the load and load placement. In some embodiments, the ratchet system will comprise an enclosure or housing (also referred to as a cover herein) which protects all or a portion of the ratchet system from the elements. In this manner the ratchet system can be installed on a truck, trailer, or the like, and remain in place even during inclement weather.

In one embodiment two or more ratchet systems can be used on either side of a truck bed. They can be deployed quickly and easily to secure a load.

Figure 11:
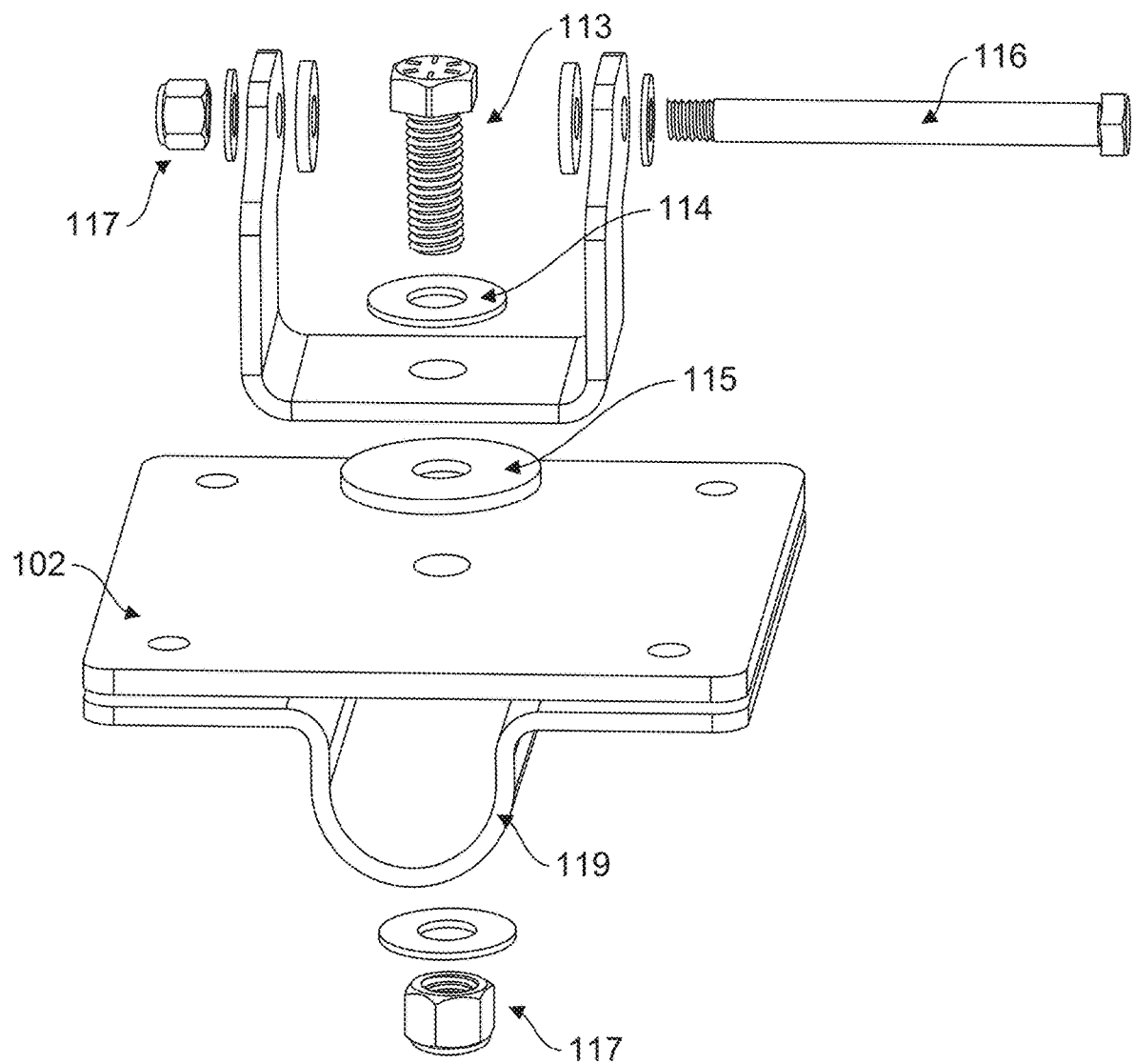
FIG. 11 is a perspective view with a base mount designed to fit a round tube in one embodiment.

Turning to FIG. 11, FIG. 11 is a perspective view with a base mount 102 designed to fit a round tube in one embodiment. As can be seen, the base mount 102 is sized to fit and couple around a round tube. The first pivot point 103, as shown, is made by coupling the base mount 102 to the ratchet mount 104 via a bolt or the like. As shown, the bolt comprises a vertical bolt 113. While the term "bolt" is used, this can comprise any coupling device including a screw, bolt, etc. The vertical bolt 113 is secured using a nut 117. In one embodiment the vertical bolt 113, the nut 117, and the washers 114 all comprise brass. The support washer 115, which is located between the ratchet mount 104 and the base mount 102 can comprise virtually any type of polymer, including nylon, Teflon, Daltrim, etc., The support washer 115 provides support and rigidity to the system.

The materials of the system can vary depending upon the desired application. In one embodiment the mounts comprise steel or stainless steel. In other embodiments, however, they can comprise rubber, plastics, other metals, and combinations thereof. The hardware such as the nuts and bolts can comprise steel, stainless steel, other metals, plastics, etc. In one embodiment the hardware is zinc plated.

The washers provide the necessary friction to allow the pivots to pivot. Without the washers the mounts can be overly tightened such that they tighten but do not allow pivoting or rotation. Washers allow the parts to be tightened while allowing pivoting and rotation. As noted, one embodiment the washers comprise Teflon, nylon, etc. Such materials provide for sufficient movement and rotation.

The ratchet mount 104 can rotate about the first pivot point 103. Thus, it can rotate clockwise or counterclockwise relative to the vertical bolt 113. As shown, the ratchet mount 104 rotates in a direction perpendicular to the vertical bolt 113.

The ratchet 106 (not shown) can also pivot about the second pivot point 105. As shown, the second pivot point 105 comprises the horizontal bolt 116, any necessary washers, and the nut 117. This allows the ratchet 106 to pivot relative to the ratchet mount 104 via the horizontal bolt 116. The second pivot point 105 is perpendicular to the horizontal bolt 116.

As shown, the base mount 102 can secure to a round pipe. The ratchet system can then be secured and deployed from the round pipe. As depicted, the base mount 102 comprises a receiving void 119 to receive the tube. Since it is designed to receive a circular tube, the receiving void 119 is circular. However, the receiving void 119 shape can be modified for any type of shape to be received. Having a mount 102 which can secure to various structures or items increases the locations from which the ratchet system can be deployed.

Figure 12:
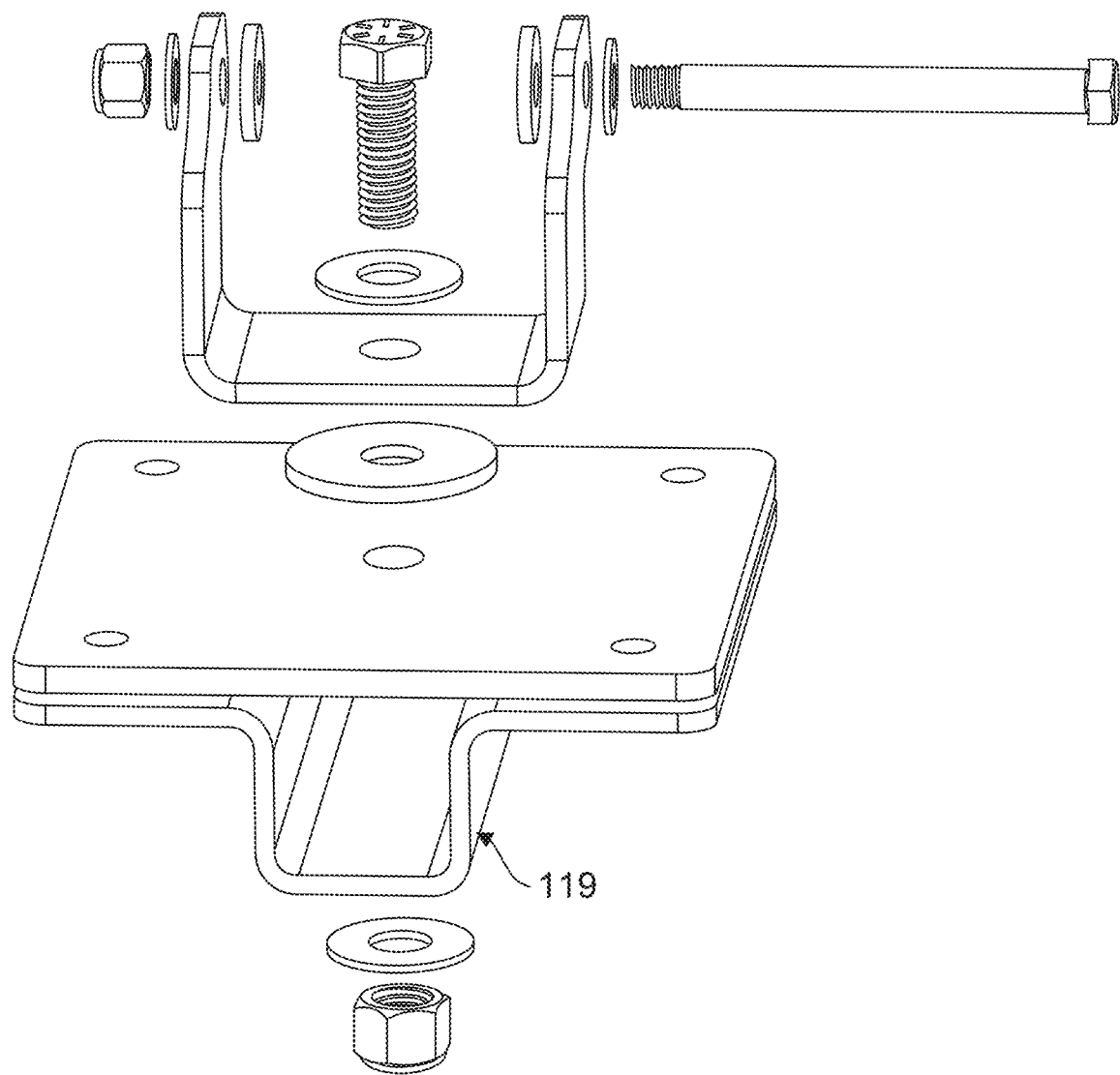
FIG. 12 is a perspective view with a base mount designed to fit a square tube in one embodiment.

Turning to FIG. 12, FIG. 12 is a perspective view with a base mount designed to fit a square tube in one embodiment. The base mount 102 in FIG. 12 works similarly to the system described in FIG. 11 but instead, the system couples to a square tube. As shown, the base mount 102 slides over a square tube. The base mount 102 can couple or secure to the square tube via a bolt, screw, friction, or the like.

Figure 13:
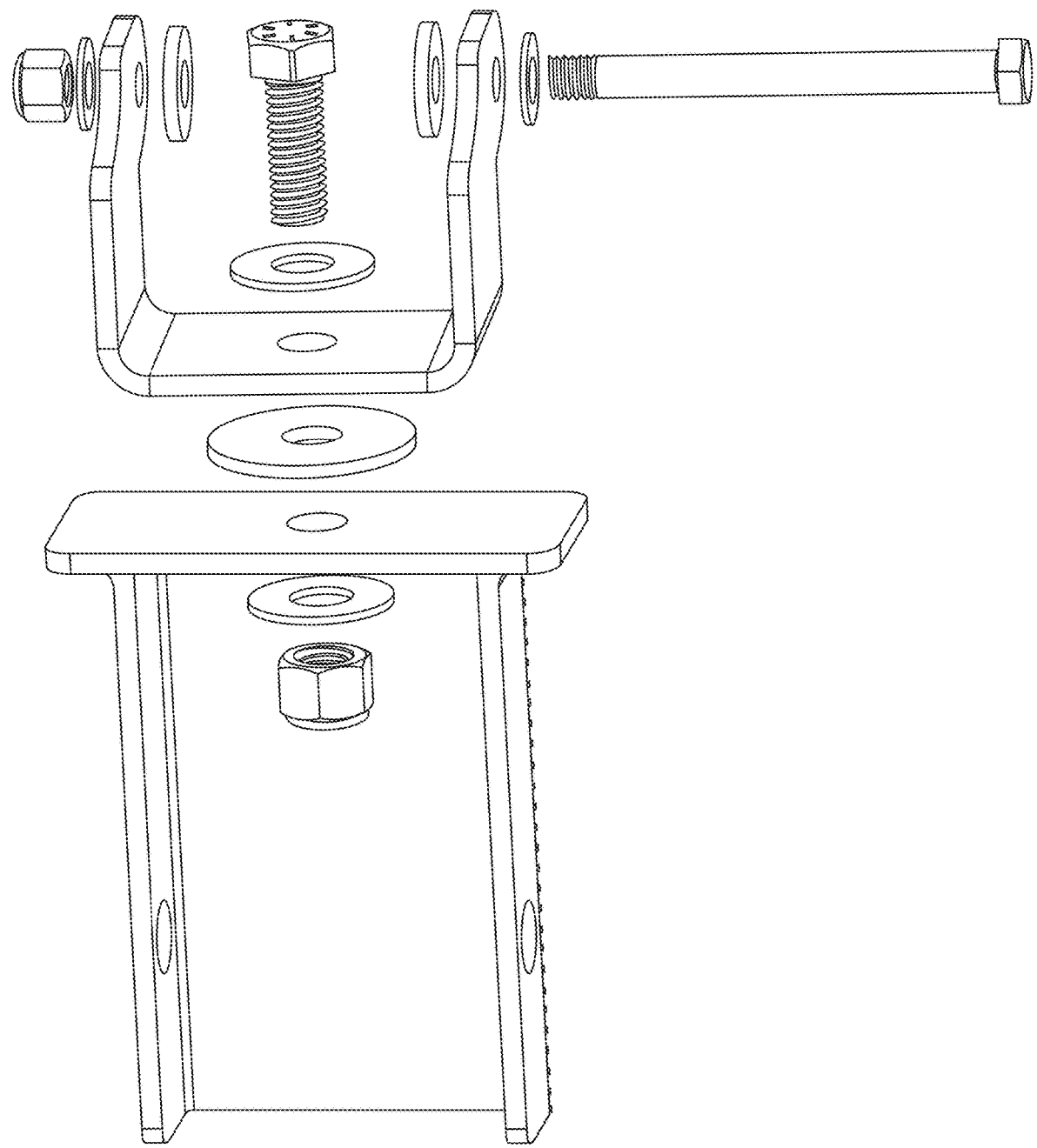
FIG. 13 is perspective view with a base mount designed to fit with a stake bed pocket mount in one embodiment.

Turning to FIG. 13, FIG. 13 is perspective view with a base mount designed to fit with a stake bed pocket mount in one embodiment. A trailer or truck bed often has stake bed pockets. As shown, the base mount 102 is sized to be received within such a stake bed pocket. Hardware can be utilized to secure the base mount 102 to the item, be it a trailer, truck, boat, etc. This allows the ratchet system to be coupled and secured to a stake bed pocket.

Figure 14:
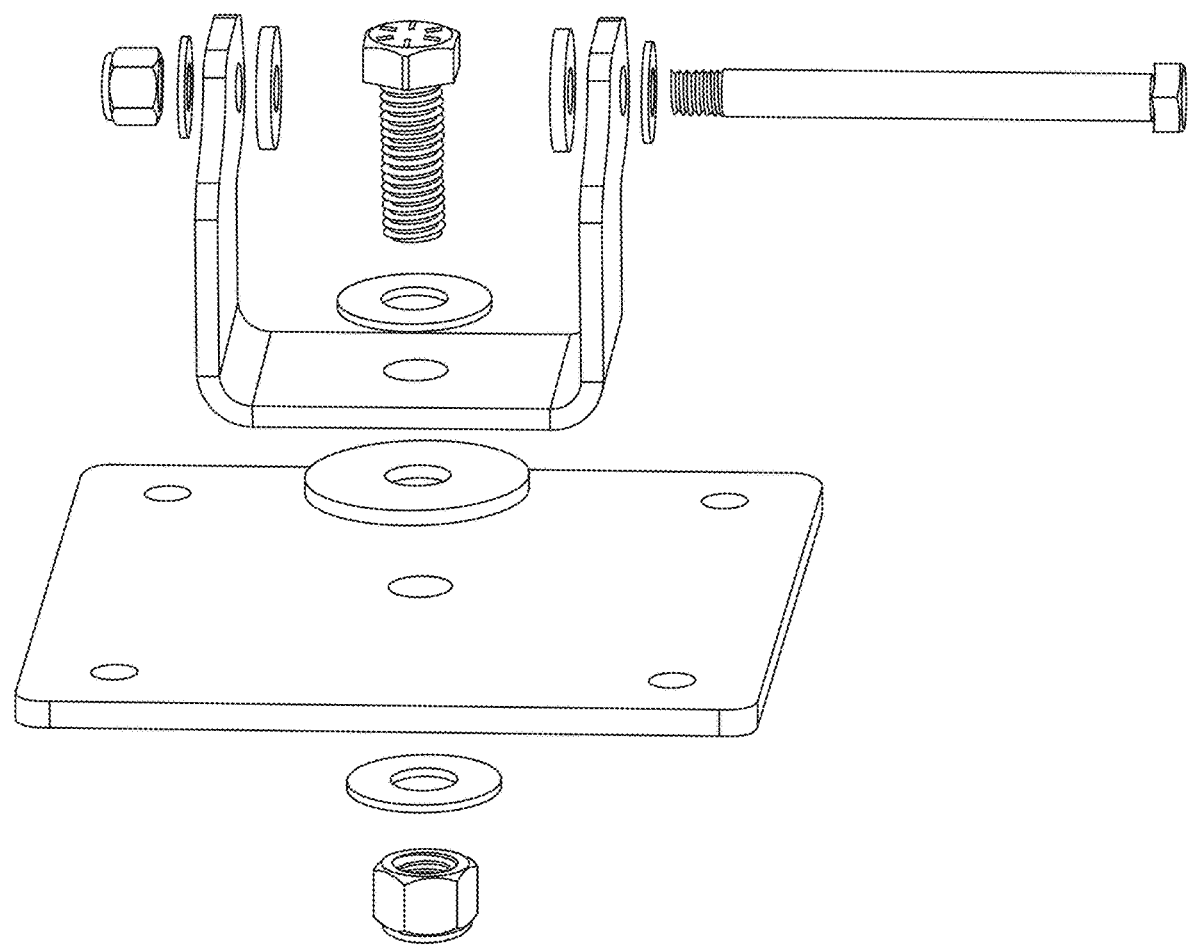
FIG. 14 is a perspective view with a base mount designed to fit with a wall mount in one embodiment.

FIG. 14 is a perspective view with a base mount 102 designed to fit with a wall mount in one embodiment. As can be seen the base mount 102 can couple to a wall.

Figure 15:
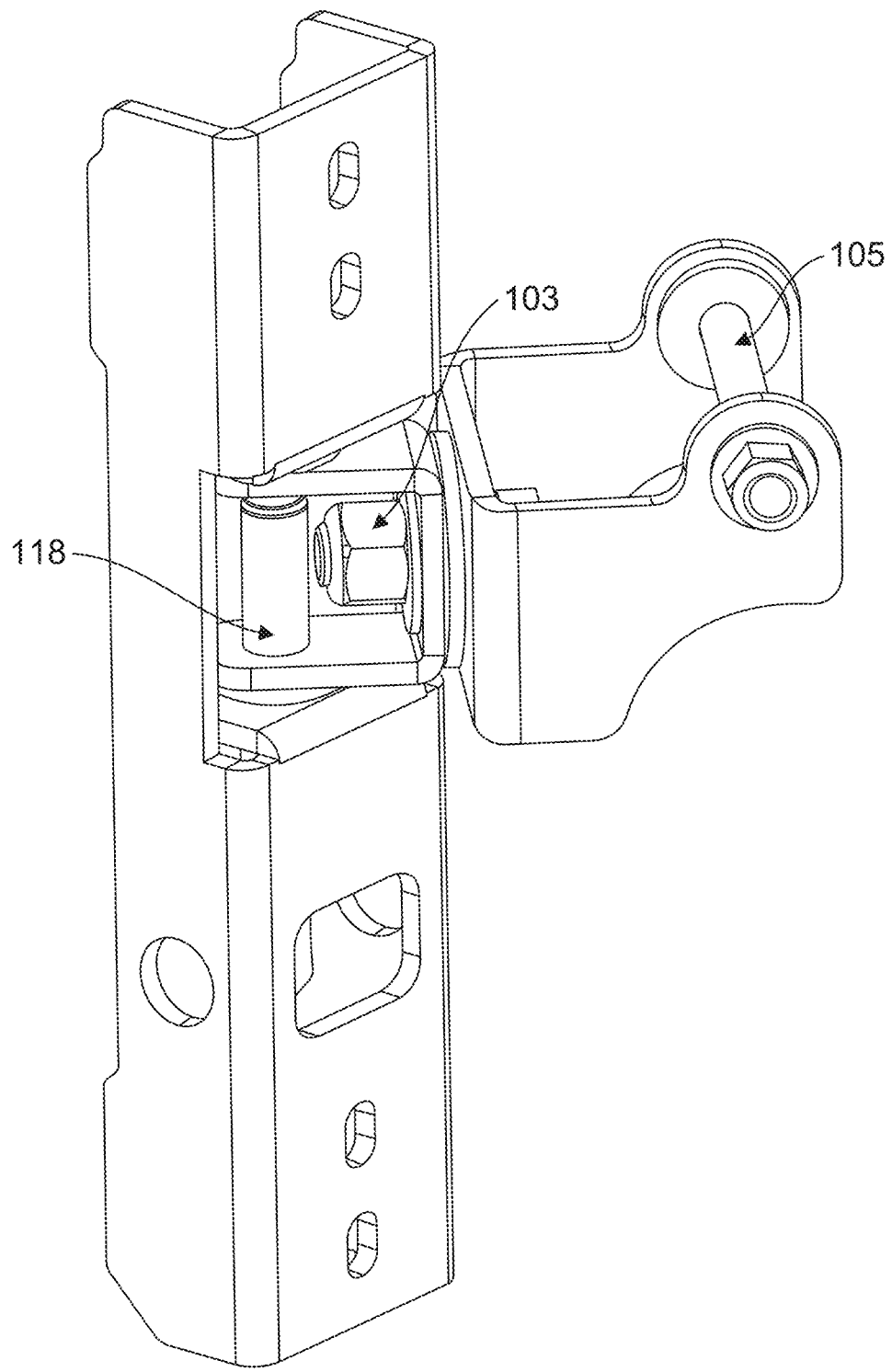
FIG. 15 is a perspective view of a base mount designed to fit with a Chevrolet in one embodiment.

FIG. 15 is a perspective view of a base mount designed to fit with a Chevrolet in one embodiment. While this embodiment is showing a Chevrolet, this embodiment can be utilized in variety of situations. As shown, the system has three pivot points. Thus, in some embodiments, the system has two or more pivot points. The third pivot point 118 allows the system to pivot about an additional bolt, screw, or the like. It provides yet an additional opportunity to get a straight line for the ratchet strap, which is desired in some embodiments. In some embodiments, if the ratchet strap is released at an undesirable angle, when the ratchet strap is retrieved, the strap can retrieve in a lopsided fashion. However, allowing the ratchet strap to ravel and unravel in a straight line prevents this.

The third pivot point 118 allows the system to pivot or rotate about the third pivot point 118. As noted, this allows the user to select a straight line of attack for the ratchet strap.

Figure 16:
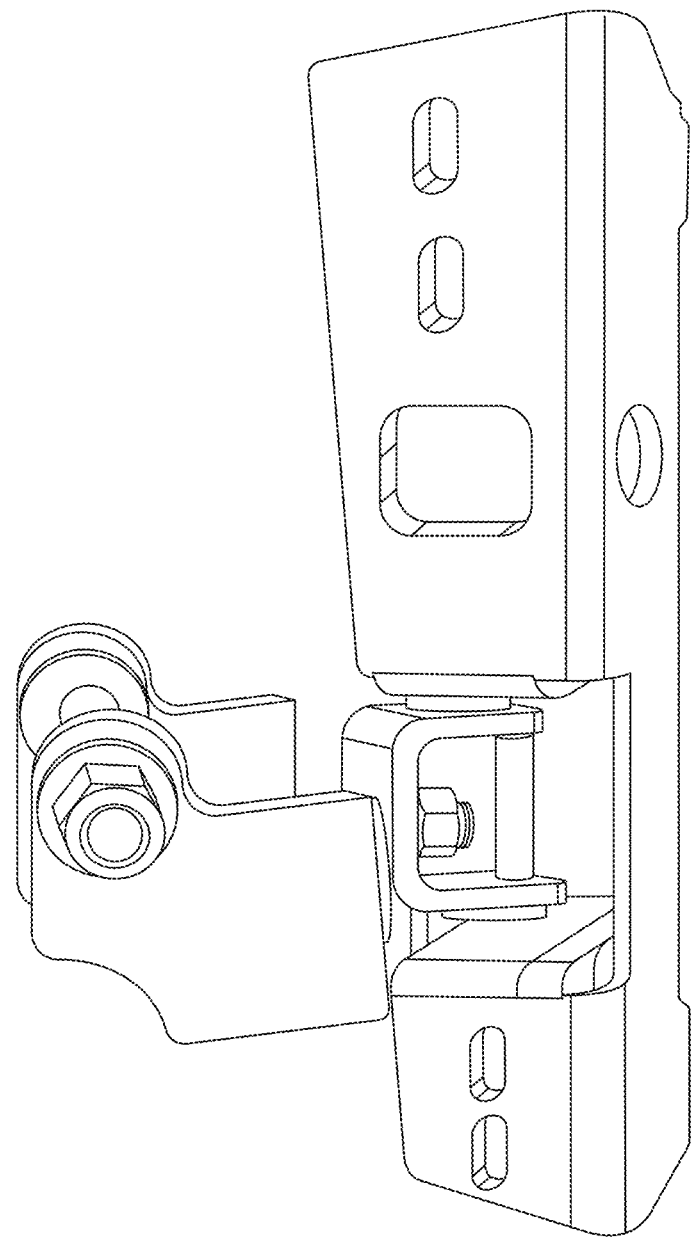
FIG. 16 is a perspective view with a base mount coupled to a Chevrolet in one embodiment.

FIG. 16 is a perspective view with a base mount coupled to a Chevrolet in one embodiment. As can be seen, in this embodiment, the base mount 102 is installed at an angle. This is because the truck bed has D-rings located at an angle. The D-rings are used as anchor points to attach a coupler or the like. In one embodiment, as shown, the base mount 102 couples and adheres to the D-rings.

As can be seen, because the D-rings are presented at an angle, without the third pivot point, the strap will not be perpendicular to the truck bed. Accordingly, the third pivot point solves this problem.

Figure 17:
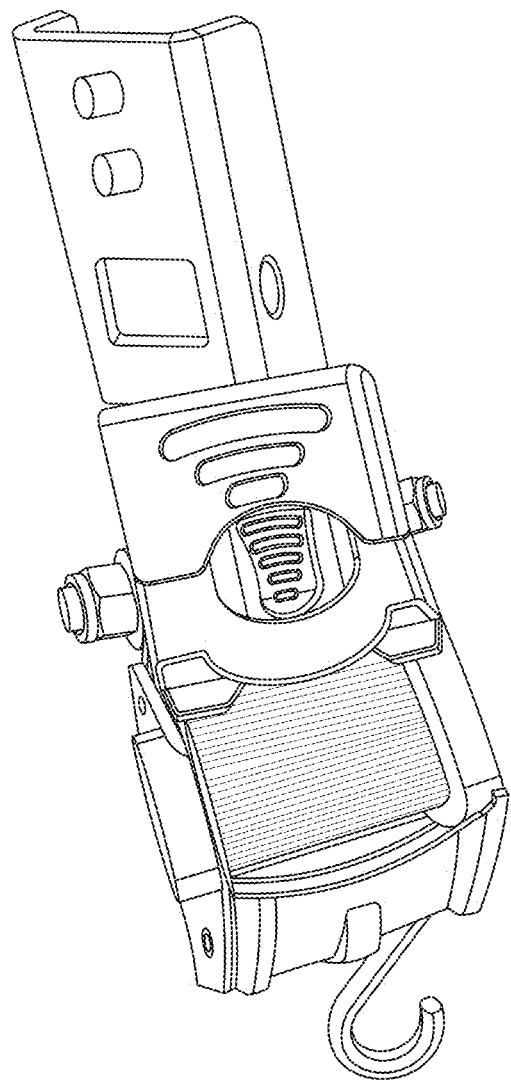
FIG. 17 is another perspective view with a base mount coupled to a Chevrolet in one embodiment.

Turning to FIG. 17, FIG. 17 is another perspective view with a base mount coupled to a Chevrolet in one embodiment. In this embodiment, the ratchet is pivoted along the third pivot point. This allows the strap to be deployed perpendicular to the truck bed length.

Figure 18:
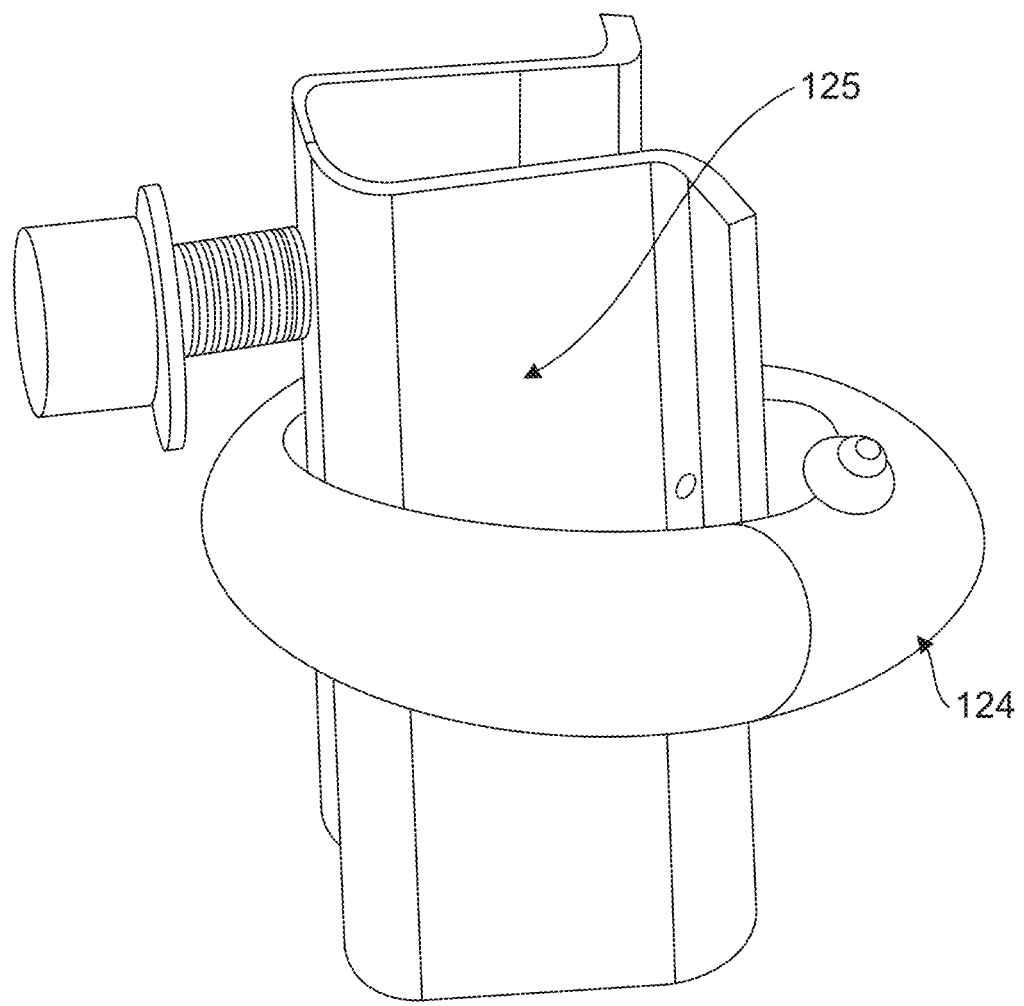
FIG. 18 is a perspective view of a ring coupler coupled to a D-ring in one embodiment.

FIG. 18 is a perspective view of a ring coupler 125 coupled to a D-ring 124 in one embodiment. Rather than having to remove the D-rings 124 which are coupled to the truck bed, in one embodiment the base mount 102 couples to the truck bed, and the D-rings 124, via a ring coupler 125. The ring coupler 125 is mounted to the D-rings 124. Thereafter, the base mount 102 couples to the ring coupler 125.

Figure 19:
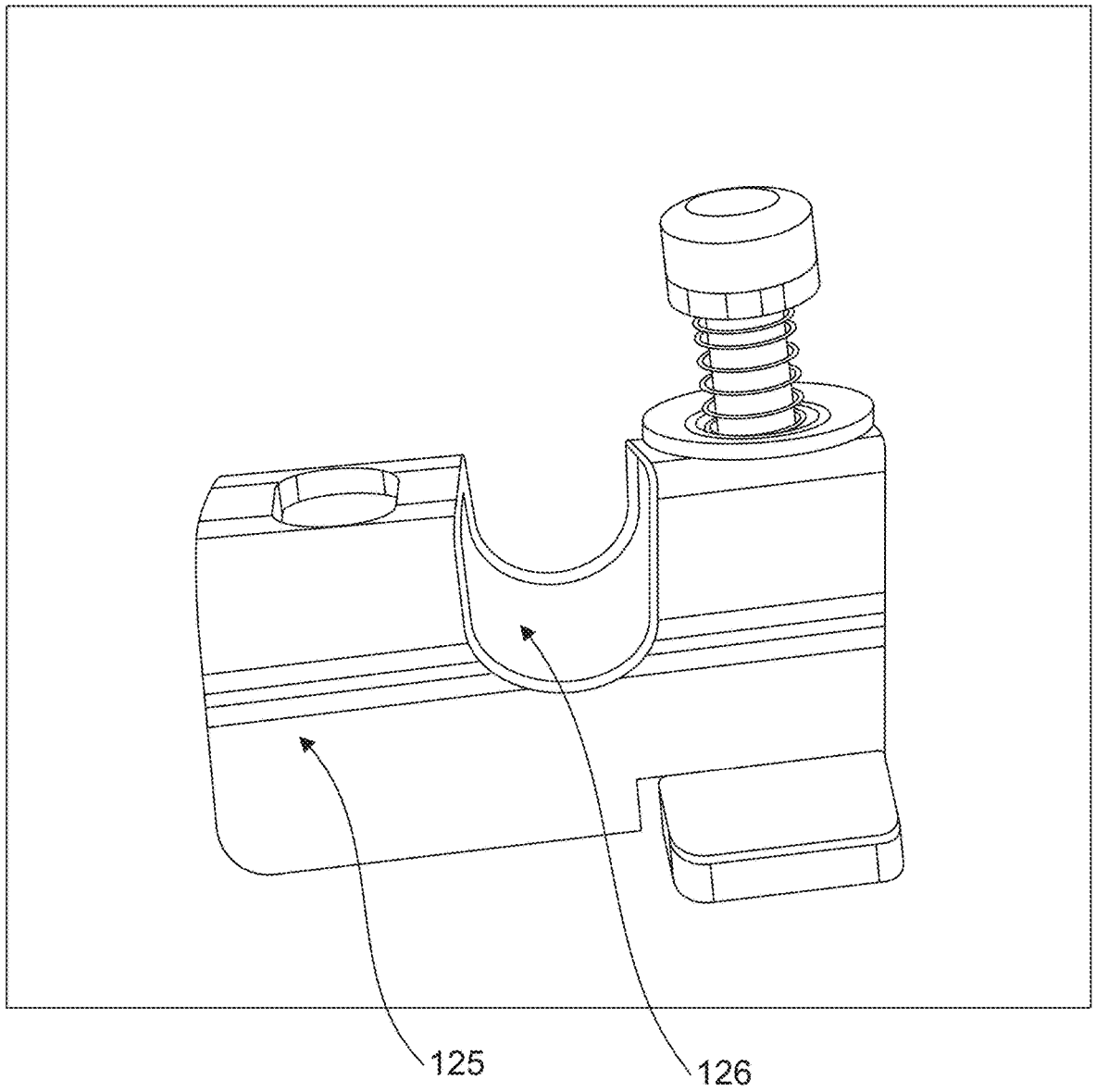
FIG. 19 is a perspective view of a ring coupler in one embodiment.

FIG. 19 is a perspective view of a ring coupler 125 in one embodiment. The ring coupler 125 has a void 126 to receive the D-ring 124. The ring coupler 125 can utilize screws, bolts, or the like, to couple the ring coupler 125 to the base mount 102.

Figure 20:
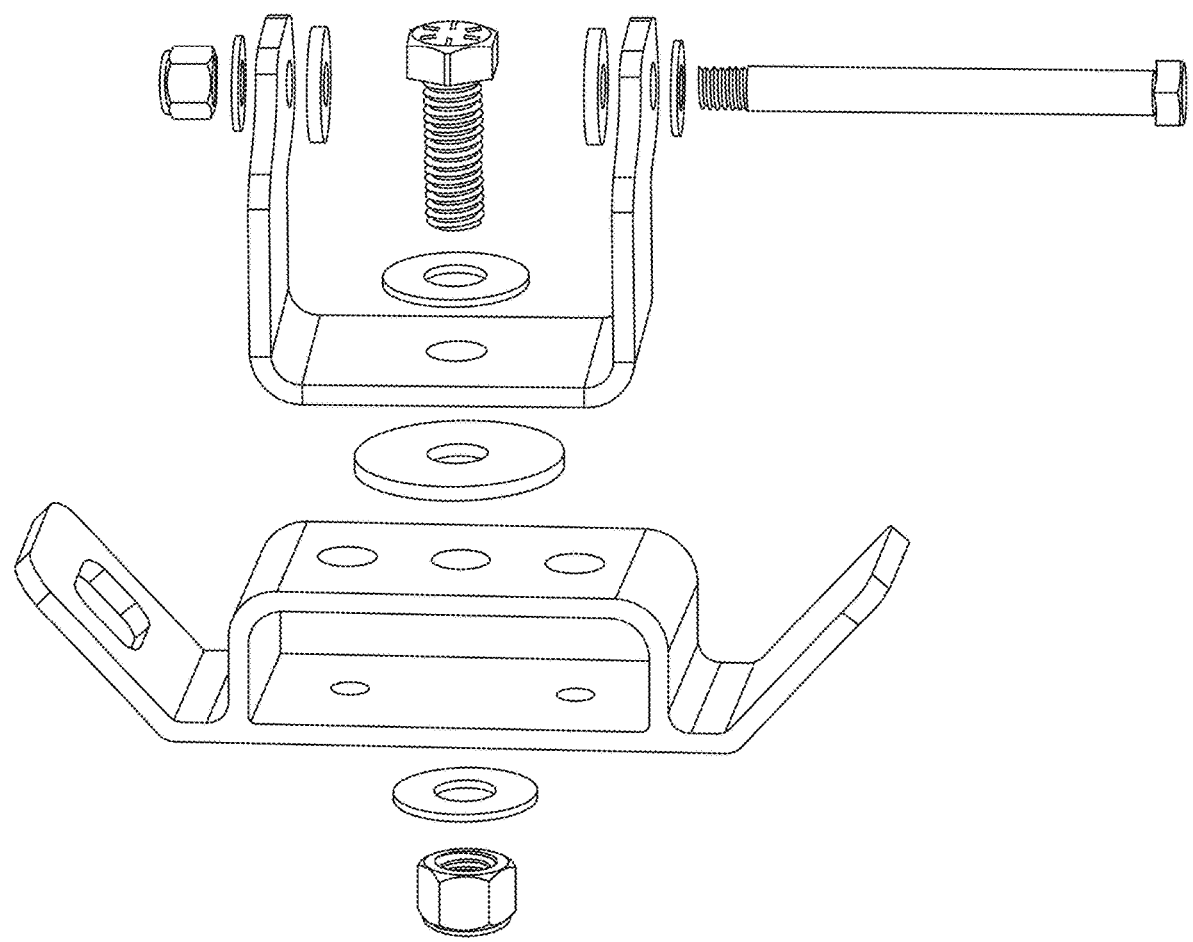
FIG. 20 is a perspective view of a base mount designed to fit with a Dodge in one embodiment.

FIG. 20 is a perspective view of a base mount designed to fit with a Dodge in one embodiment. In some embodiments, the base mount 102 is shaped to fit on a Dodge truck bed, as shown.

Figure 21:
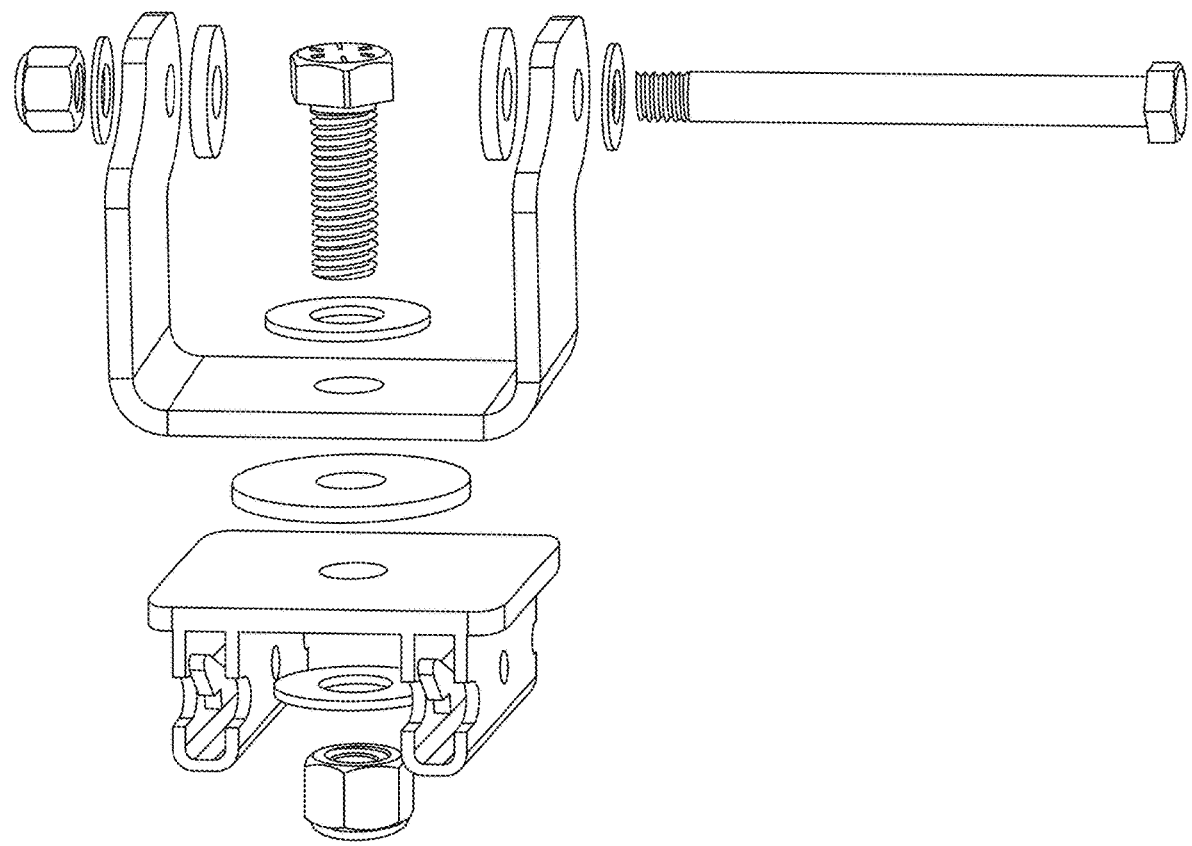
FIG. 21 is a perspective view of a base mount designed to fit with an E-track mount in one embodiment.

Turning to FIG. 21, FIG. 21 is a perspective view of a base mount designed to fit with an E-track mount in one embodiment.

Figure 22:
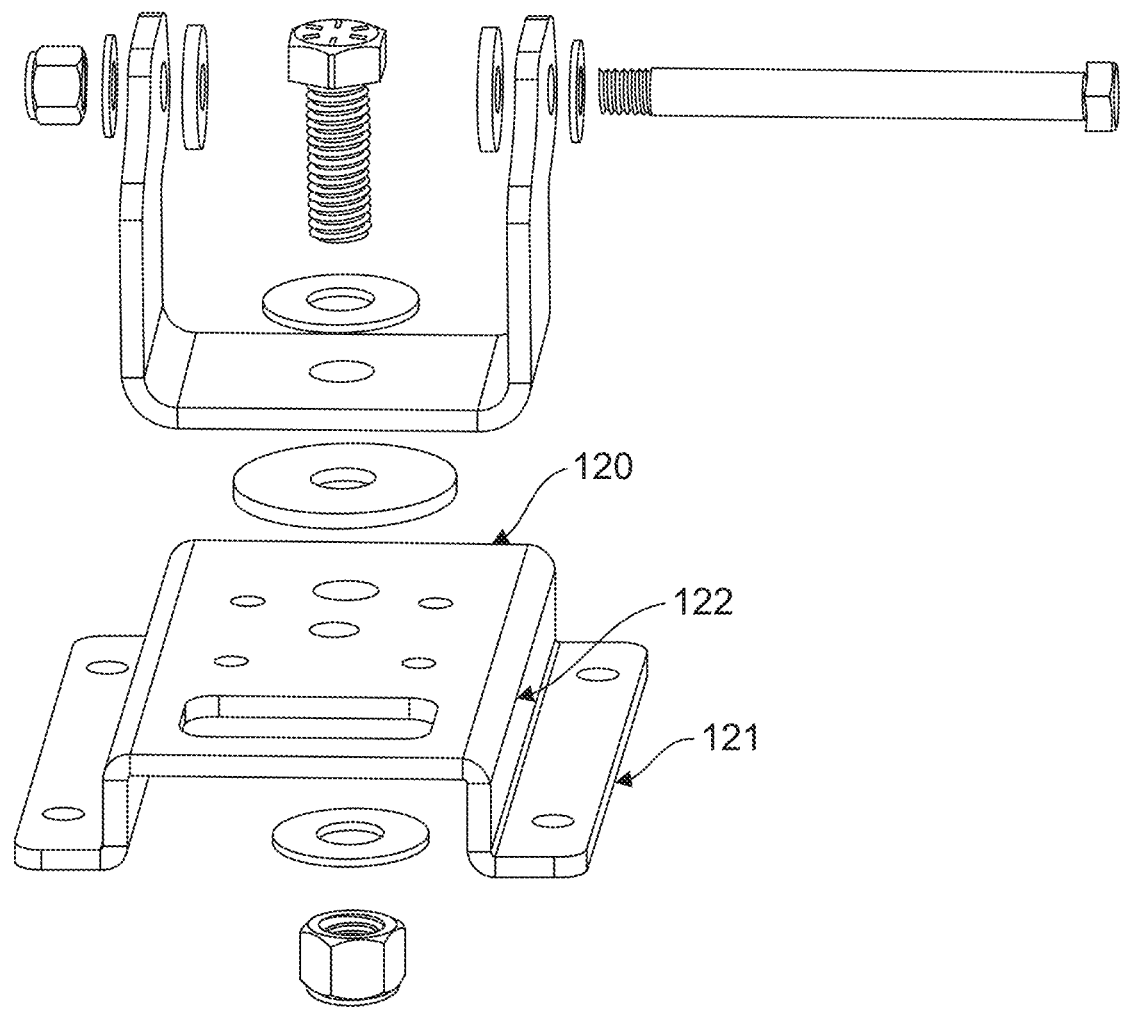
FIG. 22 is a perspective view of a base mount designed to fit with a Ford in one embodiment.

As previously depicted, FIG. 22 is a perspective view of a base mount designed to fit with a Ford in one embodiment. The base mount 102 can be mounted as previously described. The result is a ratchet system with at least two pivot points.

As shown, the base mount 102 comprises a planar portion 120. The planar portion 102 is the planar part of the base mount 102 through which the bolt or other hardware for the pivot point is inserted. In one embodiment the planar portion 120 is adjacent to the bottom portion of the ratchet mount 104 when installed.

As depicted, the base mount 102 further comprises a coupling portion 121. The coupling portion 121 comprises voids which allows the base mount 102 to be secured to a structure, such as a truck bed, trailer, wall, etc.

In the embodiment shown, the base mount 102 comprises an offset portion 122. The offset portion 122 is a vertical wall which offsets the planar portion 120 from the coupling portion 121. The offset portion 122 provides an offset which can receive, for example, the nut 117. Thus, the offset portion 122 provides a volume and distance to raise the planar portion 120 from the coupling portion 121.

Figure 23:
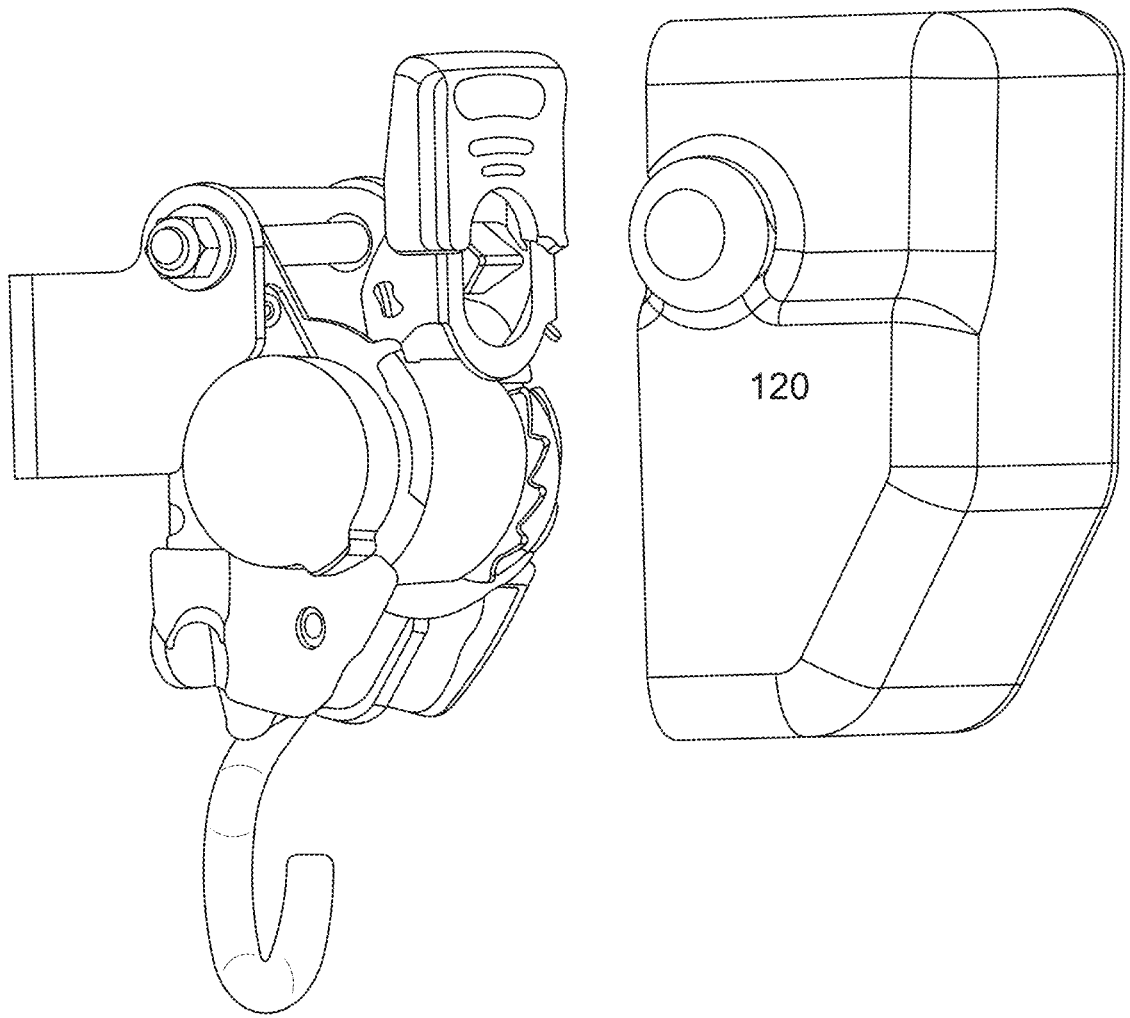
FIG. 23 is a perspective view of a cover in one embodiment.

FIG. 23 is a perspective view of a cover 127 in one embodiment. The cover 127 can comprise a variety of materials. In one embodiment the cover 127 comprises plastic, metal, rubber, or combinations thereof. The cover 127 protects the ratchet from inclement weather. As an example, the cover 127 prevents the ratchet system from getting wet with the rain. Protecting from weather and inclement weather helps keep the parts from rusting or otherwise becoming damaged.

While the invention has been particularly shown and described with reference to a preferred embodiment, it will be understood by those skilled in the art that various changes in form and detail may be made therein without departing from the spirit and scope of the invention.

What is claimed is:

1. A system comprising
   a base mount coupled to a ratchet mount via a first pivot point;
   wherein said ratchet mount comprises a second pivot point; and
   wherein said base mount is pivotable relative to said ratchet mount via said first pivot point;
   wherein said first pivot point comprises a vertical bolt, and wherein said second pivot point comprises a horizontal bolt;
   a support washer located between said base mount and said ratchet mount, said support washer located on said vertical bolt.

2. The system of claim 1 further comprising a ratchet coupled to said ratchet mount, and wherein said ratchet is pivotable about said second pivot point.

3. The system of claim 2 wherein said ratchet comprises a ratchet handle, a strap, a ratchet coupler on said strap, and a center spool for storing said strap.

4. The system of claim 1 wherein said base mount comprises base voids for coupling said base mount to a structure.

5. The system of claim 4 wherein said structure is a bed of a truck.

6. The system of claim 1 wherein said vertical bolt is approximately perpendicular to said horizontal bolt.

7. The system of claim 1 wherein said washer comprises nylon.

8. The system of claim 1 wherein said base mount comprises a receiving void for receiving a tube.

9. The system of claim 1 wherein said base mount comprises a stake bed pocket mount.

10. The system of claim 1 wherein said base mount comprises a planar portion for coupling said first pivot point.

11. The system of claim 10 wherein said base mount further comprises a coupling portion for coupling said base mount to a structure, and an offset portion connecting said planar portion with said coupling portion.

12. The system of claim 1 wherein said base mount comprises a shape for use as an E-track mount.

* * * * *